(12) United States Patent
Paulin et al.

(10) Patent No.: US 8,879,662 B2
(45) Date of Patent: Nov. 4, 2014

(54) HIGH LEVEL IBOC COMBINING METHOD AND APPARATUS FOR SINGLE INPUT ANTENNA SYSTEMS

(71) Applicant: Electronics Research, Inc., Chandler, IN (US)

(72) Inventors: Nicholas A. Paulin, Santa Claus, IN (US); Robert W. Rose, Evansville, IN (US)

(73) Assignee: Electronics Research, Inc., Chandler, IN (US)

( * ) Notice: Subject to any disclaimer, the term of this patent is extended or adjusted under 35 U.S.C. 154(b) by 62 days.

(21) Appl. No.: 13/857,660

(22) Filed: Apr. 5, 2013

(65) Prior Publication Data
US 2013/0287144 A1    Oct. 31, 2013

Related U.S. Application Data

(60) Provisional application No. 61/623,324, filed on Apr. 12, 2012.

(51) Int. Cl.
| | |
|---|---|
| *H04L 27/00* | (2006.01) |
| *H04B 7/08* | (2006.01) |
| *H01Q 3/26* | (2006.01) |
| *H01P 1/18* | (2006.01) |

(52) U.S. Cl.
CPC ............. *H04B 7/0837* (2013.01); *H01Q 3/26* (2013.01); *H01P 1/18* (2013.01); *H01P 1/183* (2013.01)
USPC .......................................... 375/295; 327/291

(58) Field of Classification Search
CPC ........................................................ H03H 7/20
USPC ......................................................... 375/295
See application file for complete search history.

(56) References Cited

U.S. PATENT DOCUMENTS

| | | | |
|---|---|---|---|
| 2,256,538 | A | 9/1941 | Alford |
| 3,184,684 | A | 5/1965 | Alford |

(Continued)

OTHER PUBLICATIONS

Fanton, M., "IBOC combining schemes for 10dB injections", NAB BEC Proceedings, 2009, pp. 122-123.

(Continued)

*Primary Examiner* — Erin File
(74) *Attorney, Agent, or Firm* — C. Richard Martin

(57) ABSTRACT

A phase shift is defined as a point in frequency at which the phase is changed from 0 degrees to 180 degrees. A device is provided for combining analog and digital in-band-on-channel (IBOC) signals to feed a common antenna utilizing phase shifting allpass filter modules to provide a 180 degree phase shift to specific IBOC channels within a constant impedance dual-hybrid circuit. The IBOC Allpass combiner includes one input 90 degree 3 dB quadrature hybrid coupler, one output 90 degree 3 dB quadrature hybrid coupler, a load resistor, and two phase shifting allpass filter modules. Each phase shifting allpass filter module is comprised of a two coaxial cavity resonators coupled to a 90 degree 3 dB quadrature hybrid coupler. Components and modules are coupled using mating transmission lines. The four coaxial cavity resonators are used as devices to produce two distinct phase shifts at isolated upper and lower IBOC side band frequencies. The circuit is designed for one center analog frequency and two sideband IBOC OFDM carrier frequencies, such that all frequencies will combine in phase at the common antenna input with minimal loss and minimal group delay. Out of phase and spurious emissions are ported to the load resistor.

20 Claims, 13 Drawing Sheets

(56) References Cited

U.S. PATENT DOCUMENTS

| | | |
|---|---|---|
| 3,241,071 A | 3/1966 | Alford |
| 3,474,336 A | 10/1969 | Alford |
| 7,945,225 B2 | 5/2011 | Small |
| 2005/0047451 A1* | 3/2005 | Johnson ............................ 372/9 |
| 2012/0212304 A1* | 8/2012 | Zhang et al. .................. 333/174 |

OTHER PUBLICATIONS

Small, D., "A Low-Loss IBOC Combining Method", Radio World 2010, http://www.rwonline.com/printarticle.aspx?articleid=2744.

* cited by examiner

HIGH LEVEL IBOC COMBINING METHOD AND APPARATUS FOR SINGLE INPUT ANTENNA SYSTEMS

FIELD OF THE INVENTION

The present invention relates to methods and devices for combining digital and analog signals in-band on-channel (IBOC) for combined use on a single antenna system. More specifically, the present invention relates to the use of a constant impedance arrangement of resonant cavity modules and the use of phase shifting technology to achieve greater efficiency in combining digital and analog signals in-band on-channel (IBOC) to a single antenna input.

BACKGROUND OF THE INVENTION

Combining two frequencies in close proximity is a difficult engineering challenge, especially when trying to maintain high efficiency, flat group delay, low input VSWR, and high transmitter to transmitter isolation. A typical two frequency FM multiplexer can combine two stations 800 kHz or more apart. The worst case would be 0.75% bandwidth separation combining 107.1 MHz and 107.9 MHz. Existing technology uses two 4-pole filters with a cross coupling from the one-to-four cavities. Efficient combining of closer adjacent frequencies is much more difficult.

High level IBOC combining methods attempt to implement a much narrower bandwidth separation of 0.04%. Prior to the present invention, this was accomplished either with a 10 dB hybrid coupler or with a filter solution using bandpass filters as described in Fanton, M, "IBOC combining schemes for 10 dB injection," in *NAB BEC Proceedings,* 2009, pp. 122-123; and Small, D, "A Low-Loss IBOC Combining Method," *Radio World,* 2010. http://www.rwonline.com/printarticle.aspx?articleid=2744.

SUMMARY OF THE INVENTION

The approach used in the present invention uses allpass filters capable of operating with the IBOC digital transmitter at −10 dB of the analog carrier. An allpass filter is characterized by a constant amplitude response and a variable phase or group delay response over an infinite bandwidth. The heart of this approach lies with use of resonant filter cavities. Allpass filters provide a phase shift of 180 degrees at resonant frequency and a tapering phase shift on the adjacent frequencies. FIG. 1 shows a typical reflection response for S11 group delay and S11 phase.

According to the prior art, when an allpass filter module composed of two identically tuned resonant cavities and a 90 degree hybrid coupler is constructed it is normally known as a group delay compensation circuit. This device is typically used to correct for high variations of group delay in a filter system by creating the opposite group delay response. This module is typically inserted just before a filter or just after an exciter to provide extra correction at high power levels.

For the present invention, a different tuning method is used on this existing group delay module technology. Instead of tuning the resonant frequencies of the cavities in the modules on the analog carrier, they are tuned to the digital sidebands. Since there are two sidebands for IBOC, two allpass filter modules are required to phase shift both sidebands to accomplish the performance required. Each allpass filter module is tuned to provide the same group delay and same notch depth, but at different frequencies. One module is tuned for the lower sideband frequencies while the second is tuned for the higher side band frequencies. The peak of the delay response is compared to the IBOC band edges to determine group delay variation. As a single module, this variation is measured to be 1200 ns. The result of creating this response also creates a shallow notch which affects the resonant frequency more than the adjacent frequencies. Typically, −1 dB insertion loss at resonance is characteristic of high Q (quality factor) cavities. See FIG. 3. The 90 degree hybrid coupler is capable of maintaining excellent input VSWR while passing a high percentage of the power to the output port when the cavities in each allpass filter module are properly matched to one another.

According to the prior art as shown in FIG. 4, a constant impedance effect is typically achieved with band pass constant impedance combiners by tuning two sets of resonant cavities to match as closely as possible for return loss and insertion phase. The resonant cavities are then connected together by two 90 degree hybrids. The input power is equally split by the input hybrid #1 so each set of resonant cavities only sees 50% of the applied power. The remaining port on the input hybrid is isolated and sees very little power. The output hybrid #2 receives half of the total input power from each of the two bandpass resonant cavities and recombines it to the output port. The remaining port of the output hybrid is isolated and may be used to inject other frequencies.

This constant impedance combining technology has been adapted to the present invention. By connecting the two allpass filter modules and placing them in the same electrical branch of a constant impedance circuit, the allpass filter modules only see half of the total input power. A shallow insertion loss notch is created at each of the resonant sideband frequencies. As a system, the losses will only be half that of the two allpass filter modules because only ½ the applied power passes through the allpass filter modules. This is important since group delay modules typically produce heat (efficiency losses) at high power levels. The second branch of the constant impedance circuit is connected by using a critical length of transmission line. This transmission line is constructed to the same electrical length as branch one containing the two allpass filter modules.

According to one aspect of the present invention, a device for combining analog and digital in-band-on-channel signals to feed a common antenna input is provided. The IBOC combiner includes a power divider having a first/input port for receiving a digital input signal and a second/input port for receiving an analog input signal. The device further includes a first phase shifting allpass filter module having a first/input port electrically coupled in series to a third/output port of said power divider, and a second phase shifting allpass filter module having a first/input port electrically coupled to a second/output port of the first phase shifting module.

A power combiner is also provided, having a first/input port electrically coupled to a second/output port of said second phase shifting allpass filter module. A second/input port of the power combiner is electrically coupled to a fourth/output port of the power divider through a critical length of transmission line comprised of branch two. An antenna may be electrically coupled to a third/output port of said power combiner, and a load resistor may be electrically coupled to a fourth/output port of said power combiner. The power divider and power combiner are preferably 3 dB quadrature hybrid couplers.

The power divider splits the digital signal from the first/input port and transmits a first ½ of the digital signal to the third/output port of the power divider in phase, and a second ½ of the digital signal to the fourth/output port of the power divider phase shifted 90 degrees. The power divider also splits the analog signal from the second/input port and transmits a first ½ of the analog signal to the third/output port of the power divider phase shifted 90 degrees, and a second ½ of the analog signal to the fourth/output port of the power divider in phase.

The digital input signal may include an upper digital IBOC sideband and a lower digital IBOC sideband. In such a configuration, the first phase shifting allpass filter module produces a 180 degree phase shift in the lower digital IBOC sideband at an isolated frequency with a rapidly diminishing phase shift at adjacent frequencies. Similarly, the second phase shifting allpass filter module produces a 180 degree phase shift in the upper digital IBOC sideband at an isolated frequency with a rapidly diminishing phase shift at adjacent frequencies.

The power combiner receives the 180 degree phase shifted first ½ of the upper and lower digital IBOC sidebands and 90 degree phase shifted first ½ of the analog signal at the first/input port. The power combiner also receives the 90 degree phase shifted second ½ of the upper and lower digital IBOC sidebands and in phase second ½ of the analog signal at the second/input port.

The phase of the signals received at the second/input port of the power combiner are then shifted an additional 90 degrees and the phase shifted signals from the second/input port are combined with the unshifted signals from the first/input port of the power combiner for output to an antenna through a third/output port. These signals are aligned phase vectors resulting in summation to the antenna through the third/output port.

The phase of the signals received at the first/input port of the power combiner are also shifted an additional 90 degrees and the phase shifted signals from the first/input port of the power combiner are combined with the unshifted signals from the second/input port of the power combiner for output to a load resistor through a fourth/output port of the power combiner. These signals are vectorially out of phase resulting in cancellation of the respective signals to the load resistor port.

The first phase shifting allpass filter module includes a 3 dB quadrature hybrid coupler having a first/input port, which corresponds to the first/input port of the first phase shifting allpass filter module, electrically coupled to said third/output port of said power divider, and a second/output port, which corresponds to the second/output port of the first phase shifting allpass filter module. The first phase shifting allpass filter module further includes a first coaxial cavity resonator resonant at the lower digital sideband frequency electrically coupled to a third port of said 3 dB quadrature hybrid coupler, and a second coaxial cavity resonator also resonant at the lower digital sideband frequency electrically coupled to a fourth port of said 3 dB quadrature hybrid coupler.

Similar to the first phase shifting allpass filter module, the second phase shifting allpass filter module includes a 3 dB quadrature hybrid coupler having a first/input port, which corresponds to the first/input port of the second phase shifting allpass filter module, electrically coupled to said second/output port of the first phase shifting allpass filter module, and a second/output port, which corresponds to the second/output port of the second phase shifting allpass filter module. A first coaxial cavity resonator resonant at the upper digital sideband frequency electrically coupled to a third port of said 3 dB quadrature hybrid coupler, and a second coaxial cavity resonator also resonant at the upper digital sideband frequency electrically coupled to a fourth port of said 3 dB quadrature hybrid coupler are also provided as part of the second phase shifting module. The first phase shifting module shifts the lower IBOC sideband and the second phase shifting module shifts the upper IBOC sideband.

Coaxial transmission lines may be provided for connecting each of the ports to one another. The coaxial transmission lines are preferably rigid 3⅛ inch coaxial transmission lines. Adapter plates connected to the first/input port of the power divider and the second/output port of the power combiner may also be provided to accommodate larger port sizes.

Each coaxial cavity resonator preferably comprises the interior conducting surface of a cylindrical outer tube and a quarter-wave copper center conductor. Half wave cavities or other increments of quarter wave length may also be used. The cylindrical outer tube is preferably 22 inches in diameter and the copper center conductor is preferably 6 inches in diameter. The size and shape of the cavities can be varied to achieve desired results. For example, square cavities could also be used to accomplish the phase shifting. A cavity 22 inches in diameter was chose to maintain a high quality factor ("Q"). If smaller cavities are used, Q is reduced which causes efficiency to deteriorate.

According to another aspect of the invention, the first phase shifting allpass filter module produces a shift of 180 degree of the lower IBOC sideband and the second phase shifting allpass filter module produces a shift of 180 degrees of the upper IBOC sideband. Use of the device of the present invention results in an approximately 10 dB reduction in out of band spurious emissions, those emissions being redirected to the load resistor. Because of this characteristic the mask compliance of the IBOC transmitted signal is significantly improved.

According to yet a further aspect of the present invention, a method for combining analog and digital in-band-on-channel signals to feed a common antenna input is provided. The method includes the steps of: splitting a digital signal that is input to a first/input port of a power divider into two equal signals, with a first ½ of the digital signal exiting the power divider in phase at a third/output port and a second ½ of the digital signal exiting the power divider phase shifted 90 degrees at a fourth/output port; splitting an analog signal that is input to a second/input port of the power divider into two equal signals, with a first ½ of the analog signal exiting the power divider phase shifted 90 degrees at the third/output port and a second ½ of the analog signal exiting the power divider in phase at the fourth/output port; phase shifting the digital signals by passing the combined second ½ of the analog signal and second ½ of the digital signal through a set of phase shifting allpass filter modules wherein the digital signals are phase shifted 180 degrees at an isolated frequency with a rapidly diminishing phase shift at adjacent frequencies; and combining the combined first ½ of the analog and digital signals from the third/output port of the power divider with the combined second ½ of the analog and digital signals from an output of the phase shifting allpass filter module and outputting vectorially summed signals to an antenna and load resistor. The digital signal preferably includes a lower digital IBOC signal and an upper digital IBOC signal.

The step of phase shifting the digital signal may include the steps of: passing the combined second ½ of the analog signal and second ½ of the digital signal through a first phase shifting allpass filter module wherein the lower digital IBOC signal is phase shifted 180 degrees at an isolated frequency with a rapidly diminishing phase shift at adjacent frequencies; passing the combined second ½ of the analog signal and second ½ of the digital signal through a second phase shifting allpass filter module wherein the upper digital IBOC signal is phase shifted 180 degrees at an isolated frequency with a rapidly diminishing phase shift at adjacent frequencies. The allpass filter modules have minimal phase shifting affect on the analog signal and other non-resonant frequencies.

The step of combining the digital and analog signals may further comprise the steps of: receiving the 180 degree phase shifted first ½ of the upper and lower digital IBOC sidebands and 90 degree phase shifted first ½ of the analog signal at the first/input port of the power combiner; receiving the 90 degree phase shifted second ½ of the upper and lower digital IBOC sidebands and in phase second ½ of the analog signal at the second/input port of the power combiner; shifting the phase of the signals received at the second/input port an additional 90 degrees and summing vectorially the phase shifted signals from the second/input port with the unshifted signals from the first/input port for output to an antenna through a third/output port, said signals having been phase aligned vectorially by the components of the invention resulting in summation of the respective phase vectors; and shifting the phase of the signals received at the first/input port of the power combiner an additional 90 degrees and vectorially summing and largely canceling the phase shifted signals from the first/input port of the power combiner with the unshifted signals from the second/input port of the power combiner for output to a load resistor through a fourth/output port of the power combiner.

Yet a further aspect of the present invention is a device for shifting phase of discrete isolated frequencies by 180 degrees while other frequencies, even close adjacent frequencies, are essentially unaffected. The device represented in FIG. 2 according to this aspect of the invention includes an input hybrid coupler having a first/input port for receiving one or more input signals and a second/load port; a first coaxial cavity resonator tuned to an isolated frequency to be phase shifted and electrically coupled to a third port of said input hybrid coupler; and a second coaxial cavity resonator tuned to the isolated frequency to be phase shifted and electrically coupled to a fourth port of said input hybrid coupler.

According to another aspect of the invention as represented in FIG. 2, a method for shifting phase of discrete isolated frequencies by 180 degrees while other frequencies, even close adjacent frequencies, are essentially unaffected, is provided. According to the method one or more input signals are presented to an input port of an input hybrid coupler. The input hybrid coupler is used to split said one or more signals into two halves. A first half of the split one or more signals is delivered with unaltered phase to a first tuned resonant cavity tuned to an isolated frequency to be phase shifted by way of a third port of the input hybrid. A second half of the split one or more signals is delivered 90 degrees out of phase to a second resonant cavity tuned to the isolated frequency to be phase shifted by way of a fourth port of the input hybrid. The first half of the split one or more signals are reflected from the first tuned resonant cavity to the third port of the input hybrid, with any of said one or more signals at the isolated frequency 180 degrees out of phase and any of said one or more signals at frequencies other that the isolated frequency without phase shift. The second half of the split one or more signals are reflected from the second tuned resonant cavity to the fourth port of the input hybrid, with any of said one or more signals at the isolated frequency 180 degrees out of phase and any of said one or more signals at frequencies other that the isolated frequency without phase shift. The respective reflected signals are delivered to the load port of the input hybrid with the signals from the first tuned resonant cavity shifted an additional 90 degrees and the signals from the second tuned resonant cavity without additional phase shift. The first half of the split one or more signals are then recombined with said second half of the split one or more signals in phase. Any signals at resonant cavity frequency are phase shifted 180 degrees from their input phase. All other frequencies are transmitted without a shift in phase from input.

The present invention is intended for use in FM broadcast antenna systems that utilize a single transmission line. However, the application of this device could also serve stations that are operating from broadband master antenna systems to guarantee the same azimuth and elevation patterns for the IBOC broadcast as the analog broadcast.

These and other objects, features and advantages of the present invention will become apparent with reference to the text and the drawings of this application.

DETAILED DESCRIPTION OF PREFERRED EMBODIMENTS

Figure 5A:
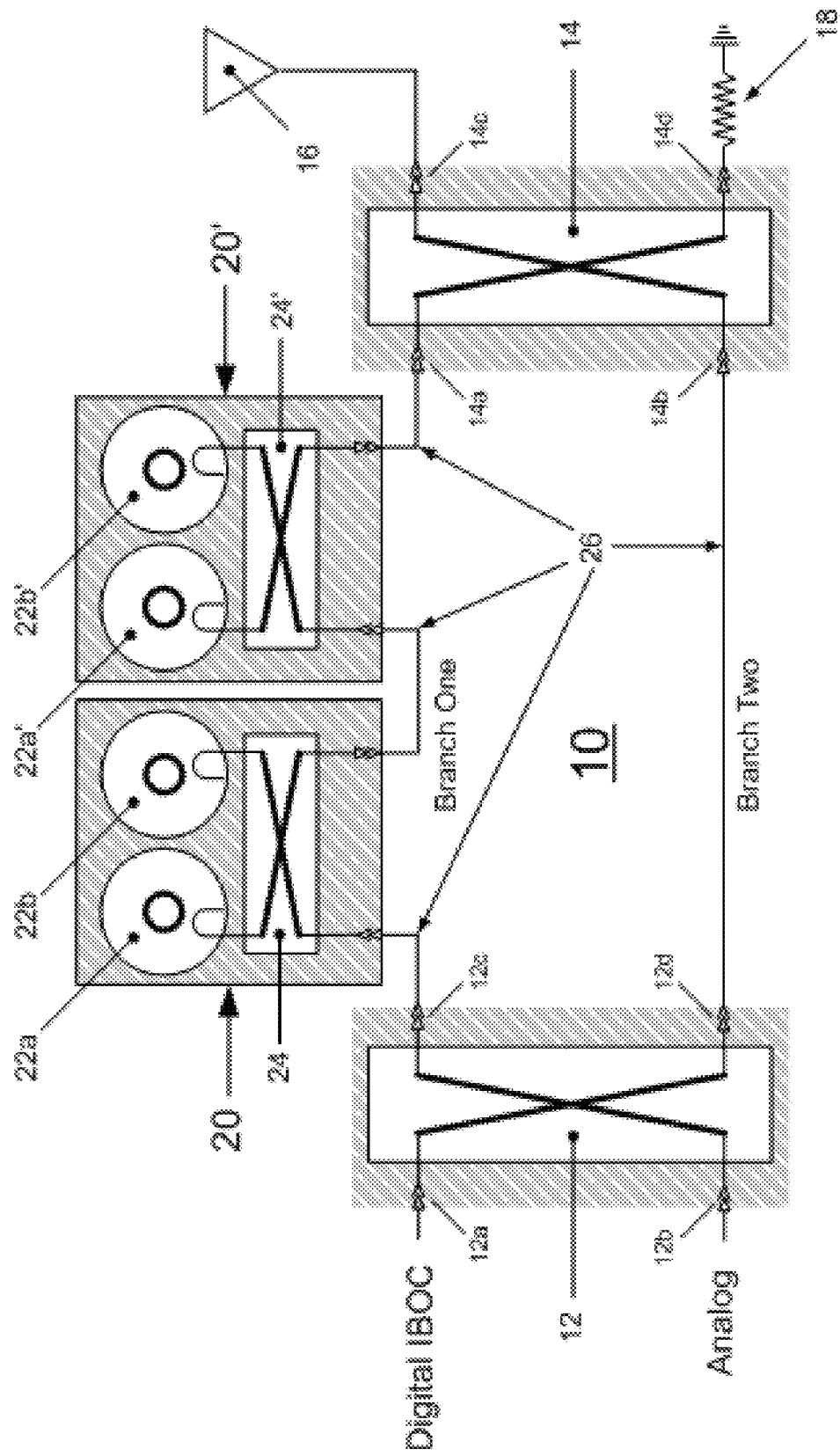
FIG. 5A shows an overview schematic diagram of an apparatus for high level IBOC combining according to a presently preferred embodiment of the invention.
Figure 5B:
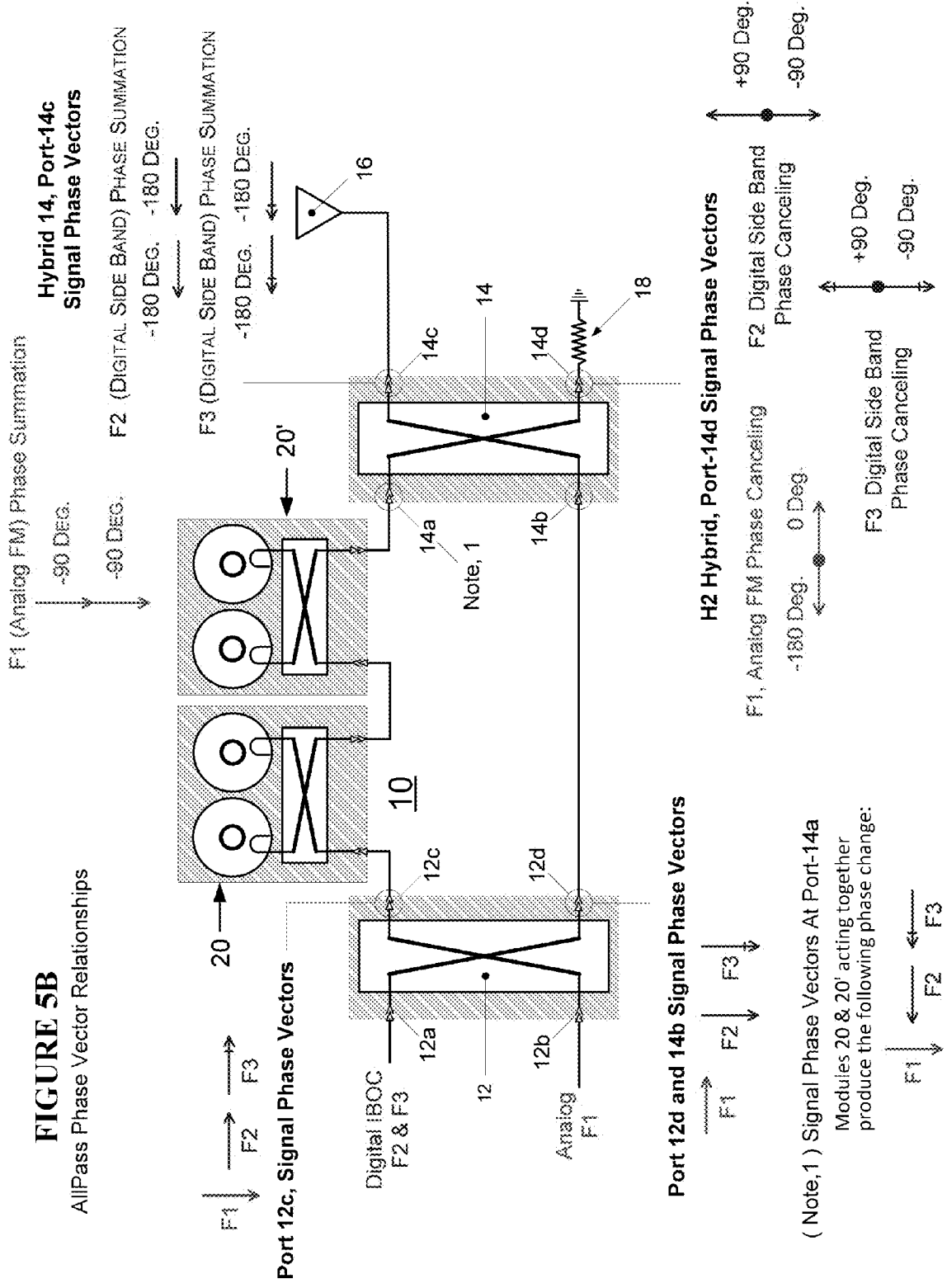
FIG. 5B shows a diagram of the apparatus for high level IBOC combining shown in FIG. 5A, showing respective signal phase vectors at various points of the apparatus.

The present invention is an IBOC Allpass Combiner 10 that combines analog and digital IBOC transmitters to feed a common antenna input utilizing phase shifting allpass filter modules to shift phase specific IBOC channels within a constant impedance dual-hybrid circuit. As shown primarily in FIG. 5A, the IBOC Allpass combiner 10 according to a presently preferred embodiment of the invention includes a first, or input 3 dB quadrature hybrid coupler 12, a second, or output 3 dB quadrature hybrid coupler 14, an antenna 16, a load resistor 18, and a pair of phase shifting allpass filter modules 20, 20'. The pair of phase shifting allpass filter modules 20, 20' are connected in series on electrical Branch One of the IBOC Allpass combiner 10. Each phase shifting allpass filter module 20, 20' is comprised of a pair of coaxial cavity resonators 22a, 22b; 22a', 22b', respectively, coupled to a 3 dB quadrature hybrid coupler 24, 24'.

The IBOC upper and lower side bands are independent amplitude modulated carrier channels which vary in bandwidth depending on the mode of operation. The IBOC transmitters operate in very close proximity to the analog carrier frequency. The analog signal, when frequency modulating, spans a +/−75 kHz wide spectrum. The analog band edges are 25 kilohertz away from the IBOC frequency band edges in MP11 mode of the IBOC standard. Because of these extremely close frequencies, combiners using banks of bandpass filtering, such as IBOC mask filter, are problematic.

In the combining method used by the IBOC Allpass combiner 10, the analog and two IBOC packets are treated as three completely discrete channels. The first phase shifting allpass filter module 20 affects the lower IBOC sideband, while the second phase shifting allpass filter module 20' affects the upper IBOC sideband. The analog channel frequencies are virtually unaffected by the techniques used to diplex the analog and digital IBOC transmitters.

The various components of the IBOC Allpass combiner 10 are preferably connected to one another by coaxial transmission lines 26. Preferably, rigid 3⅛" coaxial transmission line is used to interconnect system components and thus all components are connected using 3⅛" EIA flanges. However, the analog input-port 12b and the IBOC Allpass combiner output-port 14c can be changed to larger port sizes such as 4 1/16" or 6⅛" EIA. By selecting larger port sizes, the all pass system can operate at higher total power levels.

The IBOC Allpass combiner 10 operates with lower system loss due to the low number of coaxial cavity resonators 22a, 22b, 22a', 22b' used in its arrangement. The four coaxial cavity resonators 22a, 22b, 22a', 22b' used in the IBOC Allpass combiner 10 are not used as traditional filtering devices, but rather as devices to produce two distinct types of discontinuities. They are in effect an open and short circuit reflection. Filter cavity resonators generally use an input and output port connection associated with some type of coupling loop. Since the IBOC Allpass Combiner 10 uses cavity resonators only for their reflective properties, only one coupling loop or connection port is required for each cavity.

Each coaxial cavity resonator 22a, 22b, 22a', 22b' consists of the interior conducting surface of a 22" cylindrical outer tube and a quarter-wave, copper center conductor 6 inches in diameter. The center conductor is grounded at one end to the outer conductor while the opposite end is ungrounded. Excitation to the cavity is created by the magnetic coupling loop located at the grounded end of the center conductor. Different cavity geometry may be incorporated if designed in increments of quarter wave lengths of the specified resonant frequency.

Each single loop-fed coaxial cavity resonator 22a, 22b, 22a', 22b' produces a selective type of reflection at its resonant frequency. The traveling incident voltage and current waves, at the cavity's resonant frequency, are impressed upon the cavity resonator by means of the cavity resonator coupling loop. The signal propagates into the cavity resonator and is reflected back with a 180 degree shift in phase at the resonant frequency with only a small loss incurred. At all other frequencies for which the cavity is not resonant the open circuiting discontinuity of the loop produces a true 100% reflection of voltage and current waves with no change in phase. The 180 degree phase shift of the IBOC digital signals and 0 degree phase shift of the analog signal are key to the operation of this invention.

A unique cavity resonator is used for all FM transmitting power levels. The cavity resonators can be tuned to any digital sideband frequency within the FM spectrum because of its semi-rigid bellows extended length design and use of a large variable loop coupling mechanism. Because temperature variations can produce small changes in physical dimensions of the resonator and cavity which cause large changes in cavity resonant frequency, creating a dimensionally stable device over a range of temperatures is desired. Temperature stable materials may be employed to compensate the resonators length over a wide range of operating temperatures.

The injection (input) hybrid 12 can be considered to be a power divider that is used for simultaneous analog and digital IBOC signal injection. Four port 3 dB hybrids are frequently used to split input signals into two signals of equal amplitude and phase quadrature. For example, when the analog signal is injected into the input port 12b of the input hybrid 12, ½ the analog power emerges at each of the hybrid's two output ports 12c, 12d. Using the analog injection port 12b as a reference location, the output port directly opposite 12d receives ½ the power at 0° phase whereas its adjacent output port 12c also sees ½ the power; however the phase is electrically delayed by 90°. Similarly, the hybrid's other injection port 12a, designated as digital, receives the IBOC sidebands and delivers to the respective output ports 12c, 12d two equal amplitude power levels which are also 90° out-of-phase with each other. However, for the input hybrid the two digital IBOC signals are phase shifted at the hybrid output in mirrored relationship with respect to the phase of the analog signal. Without the phase shifting properties of the phase shifting allpass filter modules in Branch One, the digital IBOC sidebands would de-combine into output port 14d, the dump load port of this invention, while the analog signals would recombine into output port 14c, the antenna port.

Figure 6A:
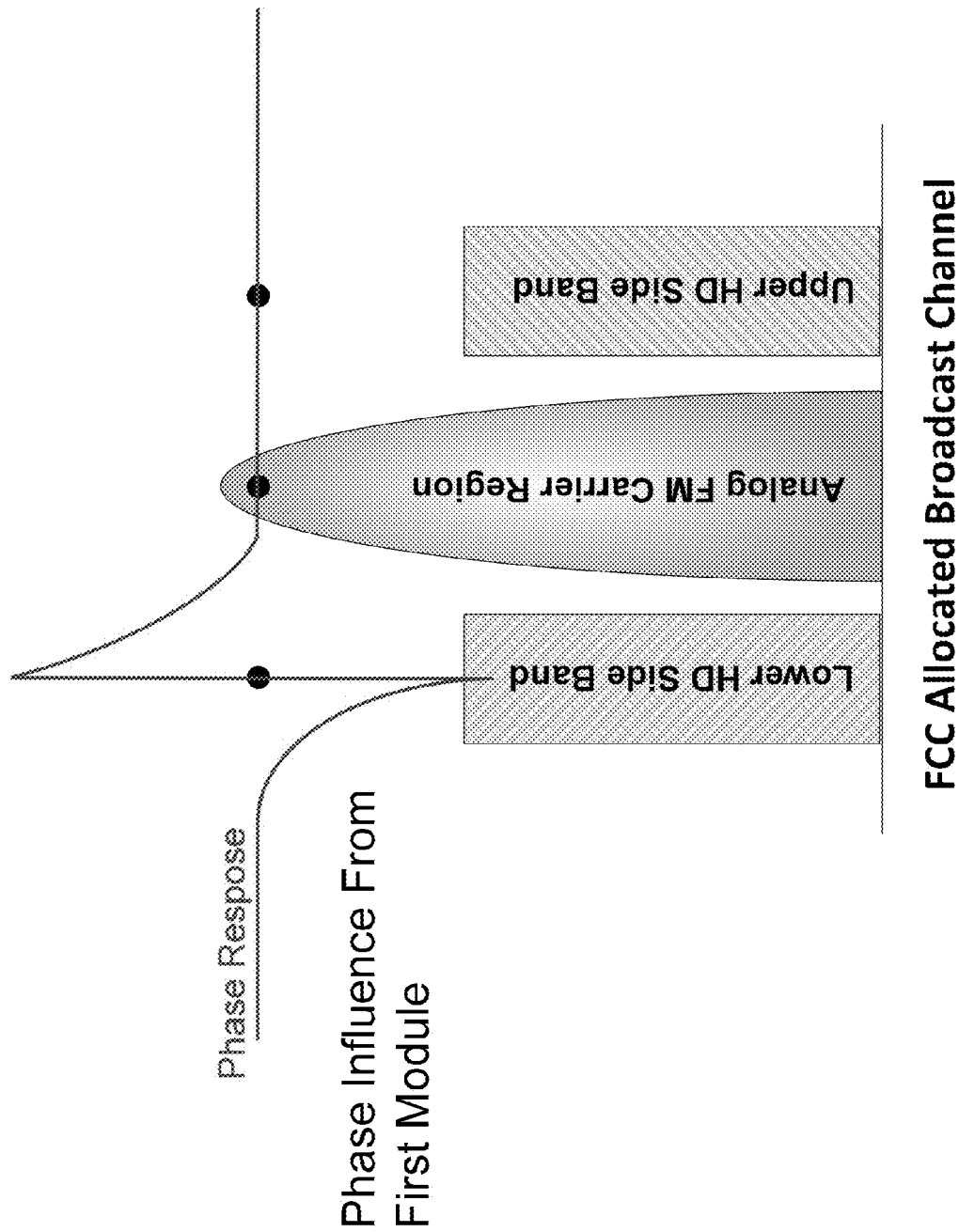
FIG. 6A shows a graph of the transmission phase response measured at the output port of the first phase shifting allpass filter module.
Figure 6B:
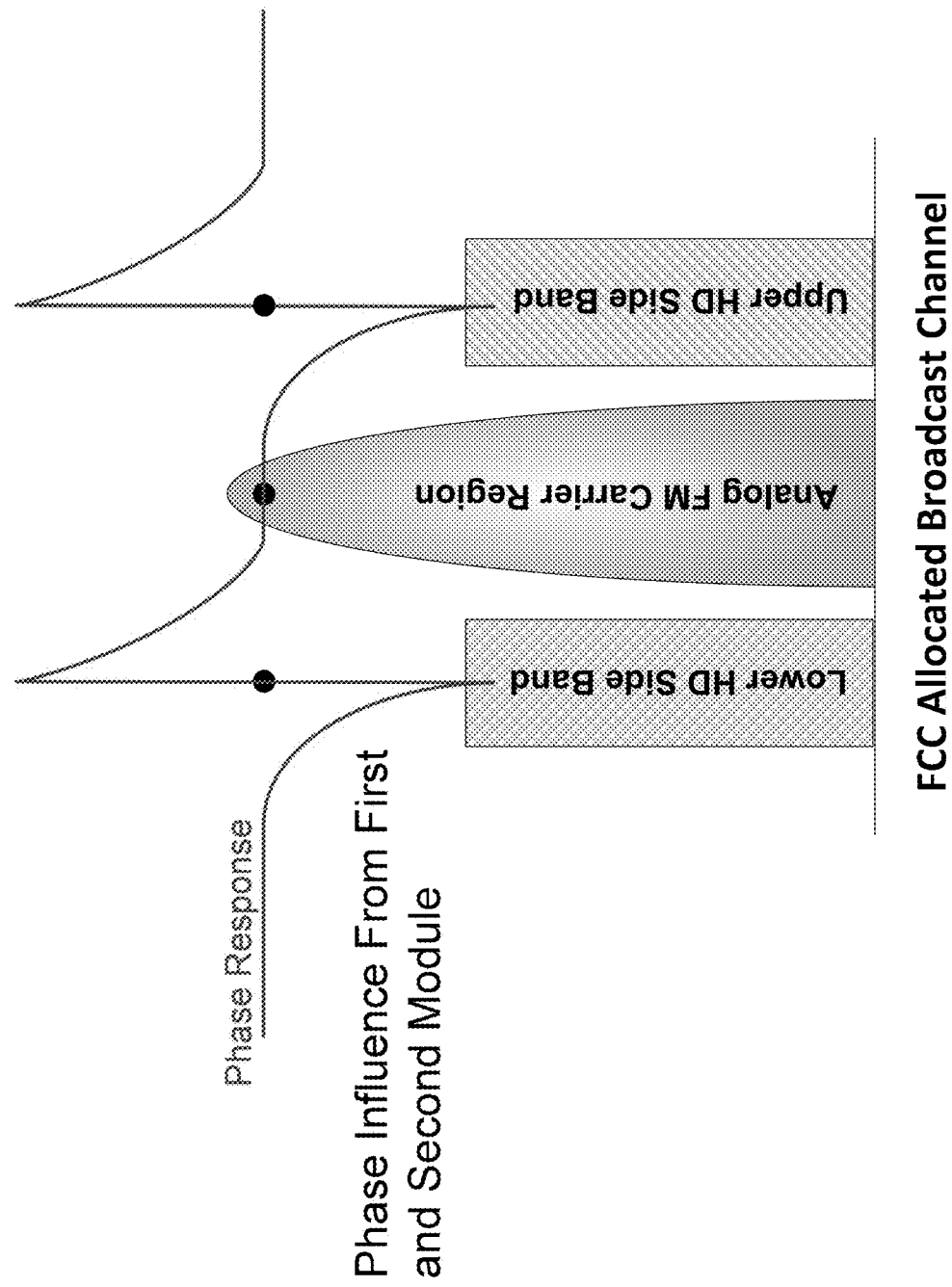
FIG. 6B shows a graph of the transmission phase response measured at the output port of the second phase shifting allpass filter module.
Figure 7:
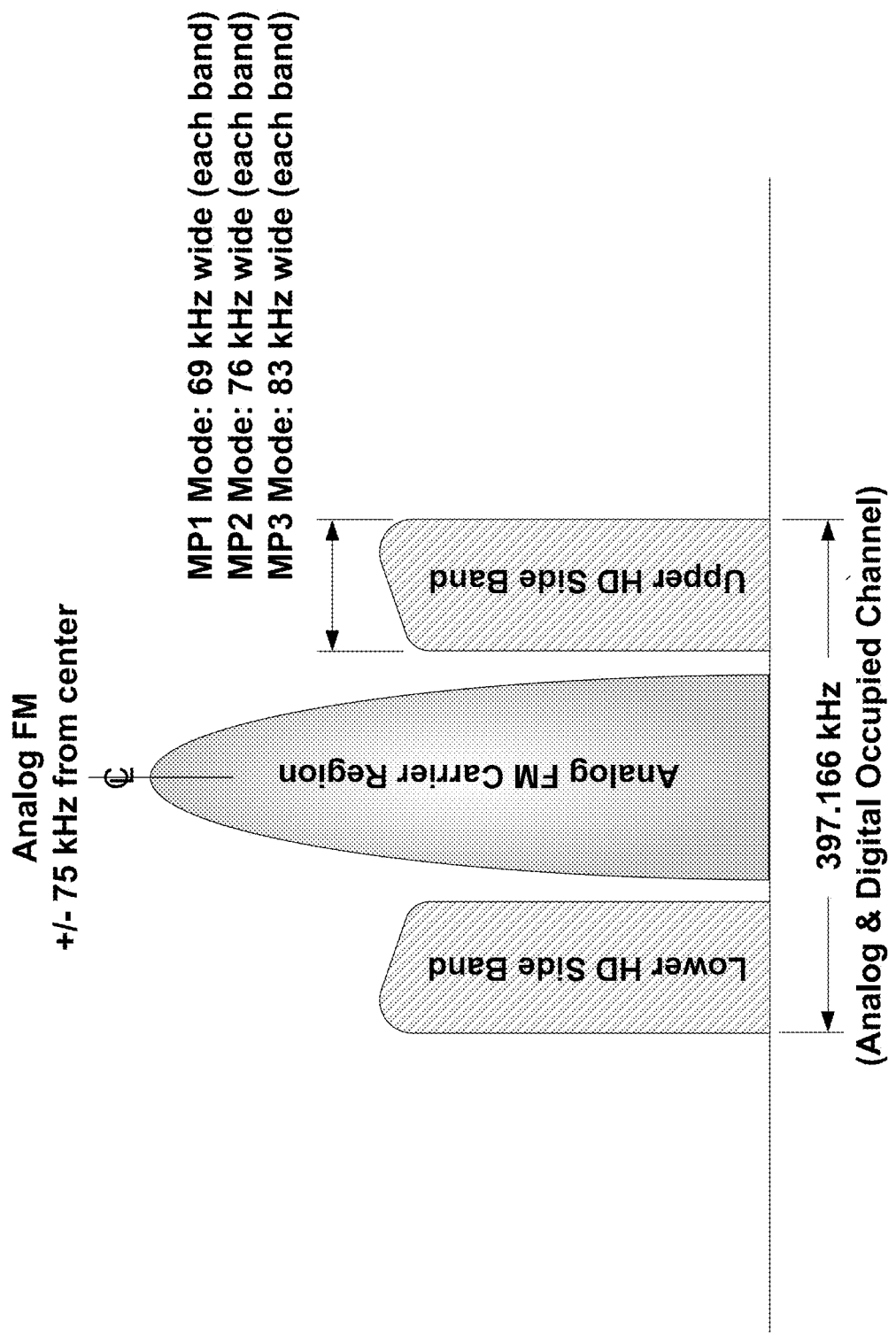
FIG. 7 shows a graphical depiction of the combined analog and digital IBOC signals transmitted to the broadcast antenna of the device shown in FIGS. 5A & 5B.

There are two important operating considerations associated with the utilization of the first and second phase shifting allpass filter modules 20, 20'. As shown in FIG. 6A, when the analog signal, the upper IBOC digital signal, and the lower digital IBOC signal pass through the first module 20, the lower IBOC signal has its phase shifted by 180 degrees while there is little affect to both the analog signal and upper digital IBOC signal, neither resonant at the first phase shifting module frequency. As shown in FIG. 6B, the second module 20' also reverses phase, however only the upper digital IBOC signal is shifted 180 degrees while there is with minimum effect on both the analog signal and the lower digital IBOC sideband.

The IBOC Allpass combiner 10 operates on the simple premise that a device can be found to cause a phase shift to each digital IBOC side band signal relative to the analog signal without causing undo distortion to the analog or the digital IBOC signals. By inserting phase shift allpass filter modules 20, 20' into Branch One of the IBOC Allpass combiner 10, the signals can be correctly phased for the combining hybrid 14 to combine all the signals in phase to just one of its two output ports, in this case, the antenna input port 16. The second output port 12d of the input hybrid 12 is connected to the second input port 14b of the output hybrid 14 at Branch Two by a critical length of transmission line 26 electrically equal in length to Branch One.

The dual set of quadrature hybrids 12, 14 and the phase shifting effects achieved by the phase shifting allpass modules 20, 20' accepts the substitution of other types of hybrids and cavity resonator devices without sacrificing the combiner's functionality (i.e. plate-coupled and reentry type hybrid couplers, 180° hybrids, ½ wavelength shorted cavity resonators). Using a single IBOC Allpass combiner 10 and efficient heat removal options (i.e., fans, fins, and port adapters), all common power handling levels can be achieved.

As discussed in the background section, prior to the present invention, there have been two types of solutions to combining analog and digital signals in close proximity to the output of the transmitter, the 10 dB high level injector and the IBOC mask filter combiner, which are both still in use. The IBOC Allpass combiner 10 of the present invention has several advantages over these prior art systems. A comparison of the efficiencies of the present approach to these other prior art approaches is shown below in Table A. The integrated loss is defined as the average insertion loss across the frequency spectrum that is used for an application. The IBOC Allpass combiner 10 of the present invention has a slight efficiency advantage overall. Table B shows the group delay comparisons between the different methods of combining. The IBOC Allpass combiner 10 shows a significant improvement over the mask filter combiner.

been successfully demonstrated to operate at high analog power levels and with −10 dBc IBOC digital transmitted power levels and found to meet FCC emission standards.

Intermodulation products are generated within a transmitter. Intermodulation products are defined as signals that are generated when two frequencies mix in a non-linear device such as a transmitter to create unwanted signals at frequencies other than the design frequency. Other terms used to describe these intermodulation products are spurious emissions and spectral re-growth. This is common with digital IBOC transmitters because there are two separate OFDM carrier frequencies that are output as the digital sidebands. The frequencies of spurious emissions are predictable given the transmitter's center frequency. Because the spurious energy can cause interference on adjacent FM channels, the Federal Communications Commission (FCC) has rules in place that

TABLE A

EFFICIENCIES COMPARISON

|  | Analog AllPass | IBOC AllPass | Analog Mask Filter | IBOC Mask Filter | Analog 10 dB Injector | IBOC 10 dB Injector |
|---|---|---|---|---|---|---|
| Input Power (dB from Analog reference) | 0 | −10 | 0 | −10 | 0 | −10 |
| Transmitter output power | 32,146 | 4,094 | 34,050 | 3,777 | 33,329 | 30,000 |
| Integrated Loss | −0.3 | −1.35 | −0.55 | −1 | −0.46 | −10 |
| Efficiency | 93.3% | 73.3% | 88.1% | 79.4% | 90.0% | 10.0% |
| Combiner output power | 30,000 | 3,000 | 30,000 | 3,000 | 30,000 | 3,000 |

TABLE B

GROUP DELAY COMPARISON

|  | FM Analog All Pass | FM HD All Pass | FM Analog Mask Filter | FM HD Mask Filter | FM Analog 10 dB Injector | FM HD 10 dB Injector |
|---|---|---|---|---|---|---|
| Group Delay (MP3) | 350 ns | 600 ns | 1.26 µs | 9.87 µs | 0 ns | 0 ns |

Figure 8:
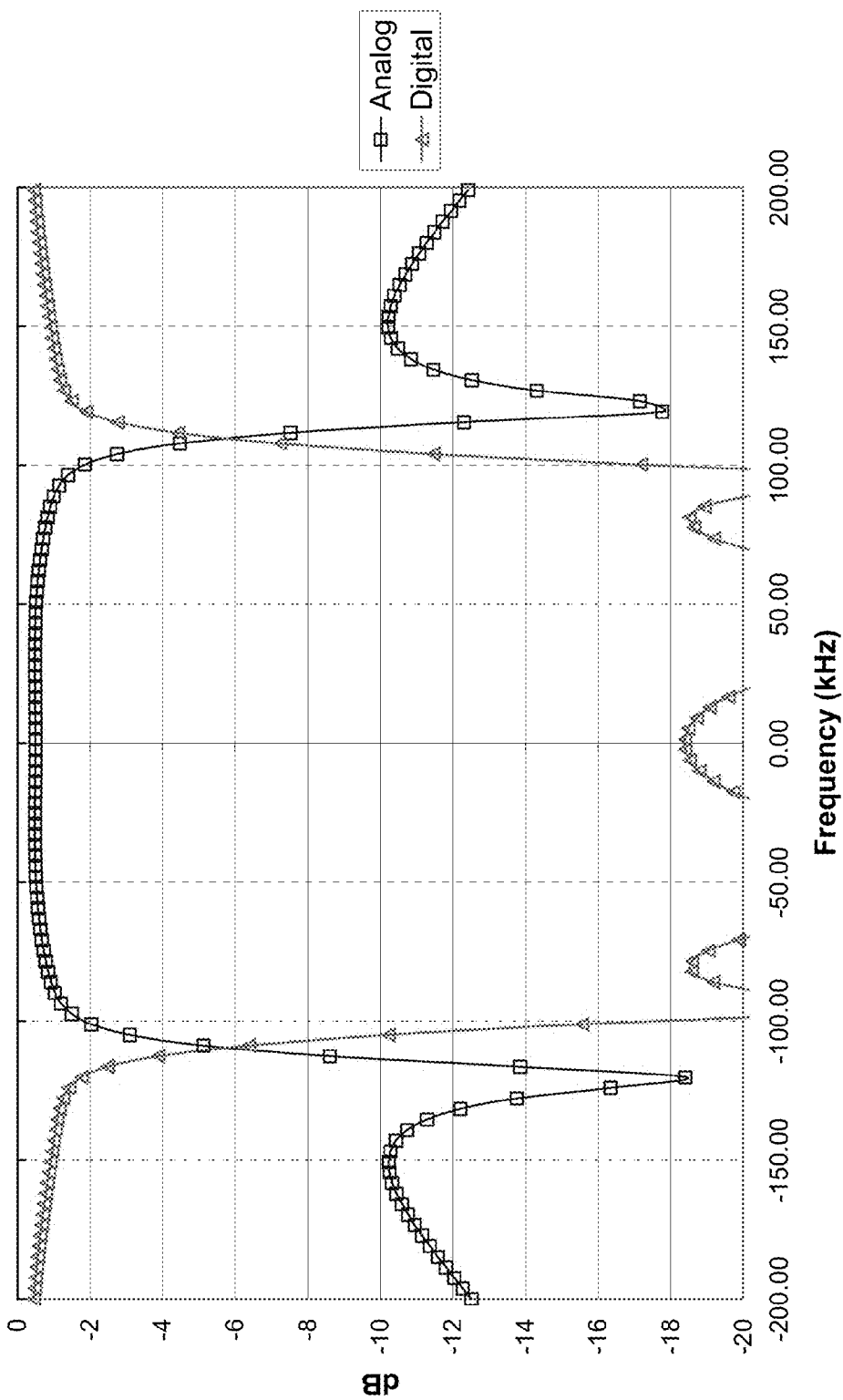
FIG. 8 shows the insertion response for a mask filter according to the prior art.
Figure 9:
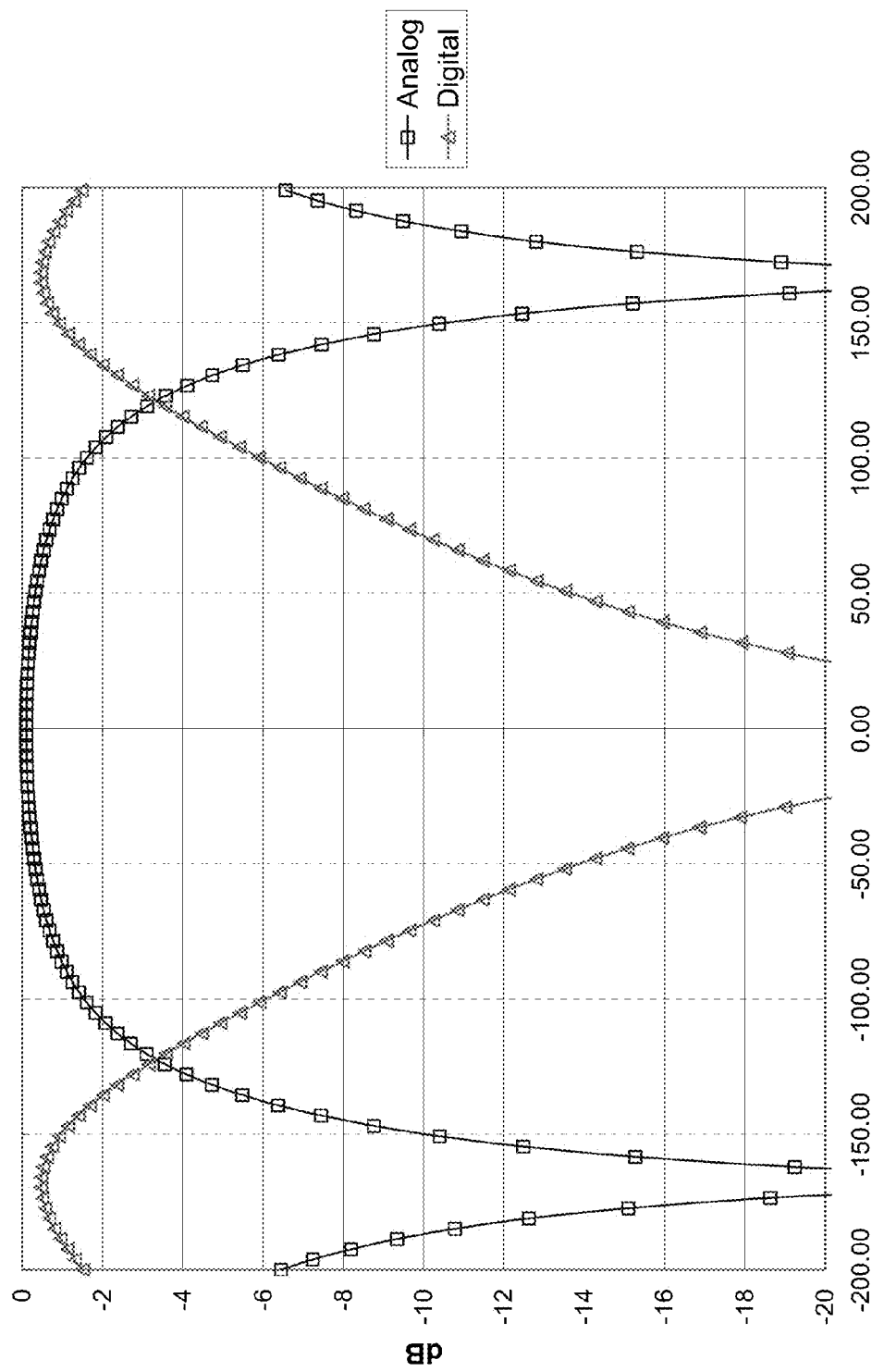
FIG. 9 shows the insertion response for the apparatus shown in FIGS. 5A & 5B.

FIG. 8 shows responses of the IBOC mask filter, and FIG. 9 shows corresponding responses of the IBOC Allpass combiner 10 of the present invention. Even though there are some differences, the efficiencies remain very close. The IBOC insertion loss response is the most variable. The mask filter combiner gives a tapered attenuation response as the frequency approaches the analog carrier, while the IBOC Allpass combiner 10 response has a maximum in the center of the digital side band.

Figure 10:
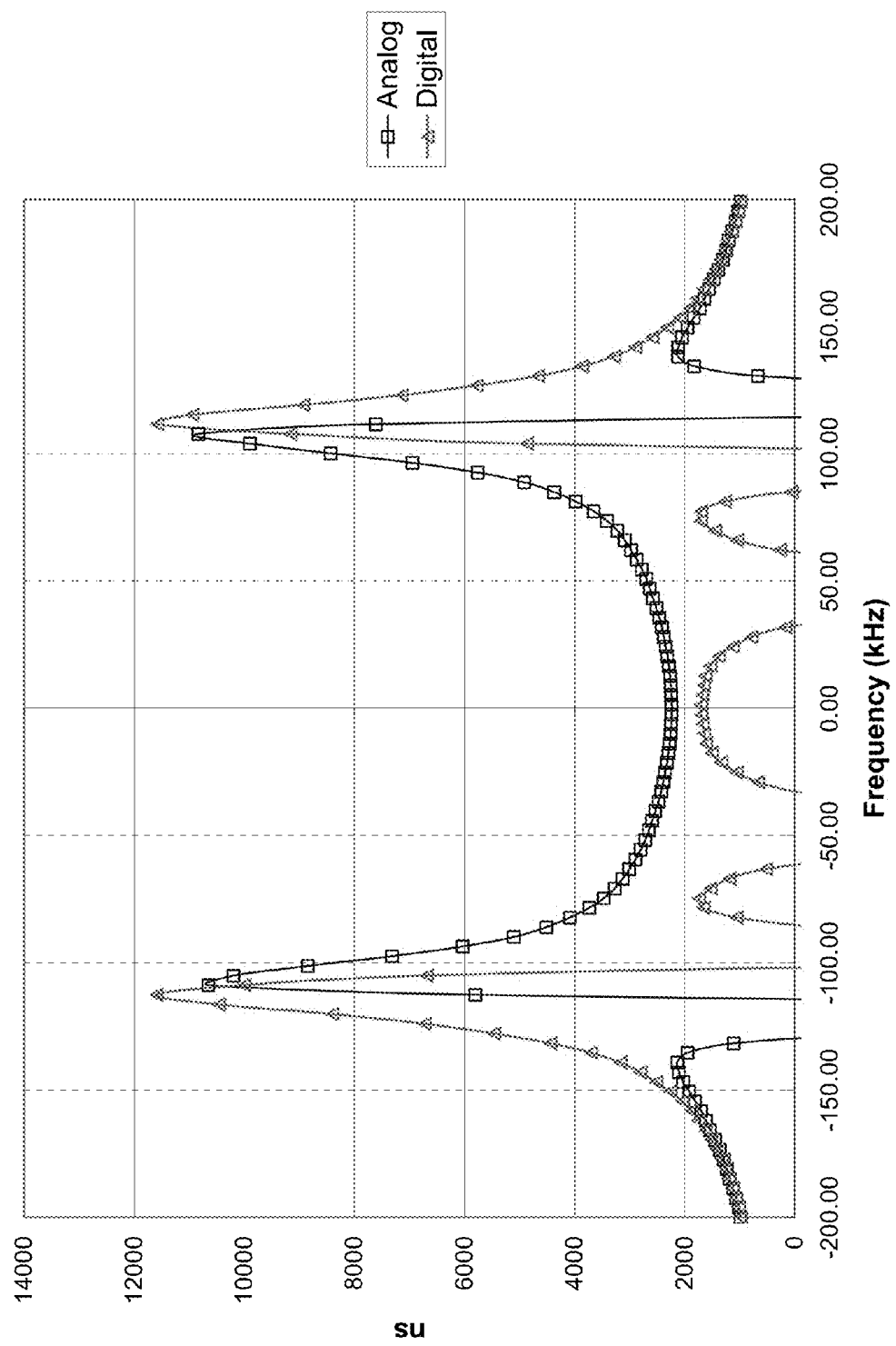
FIG. 10 shows the group delay plots with respect to their insertion response plots for a mask filter and corresponding to the data shown in FIG. 8 according to the prior art.
Figure 11:
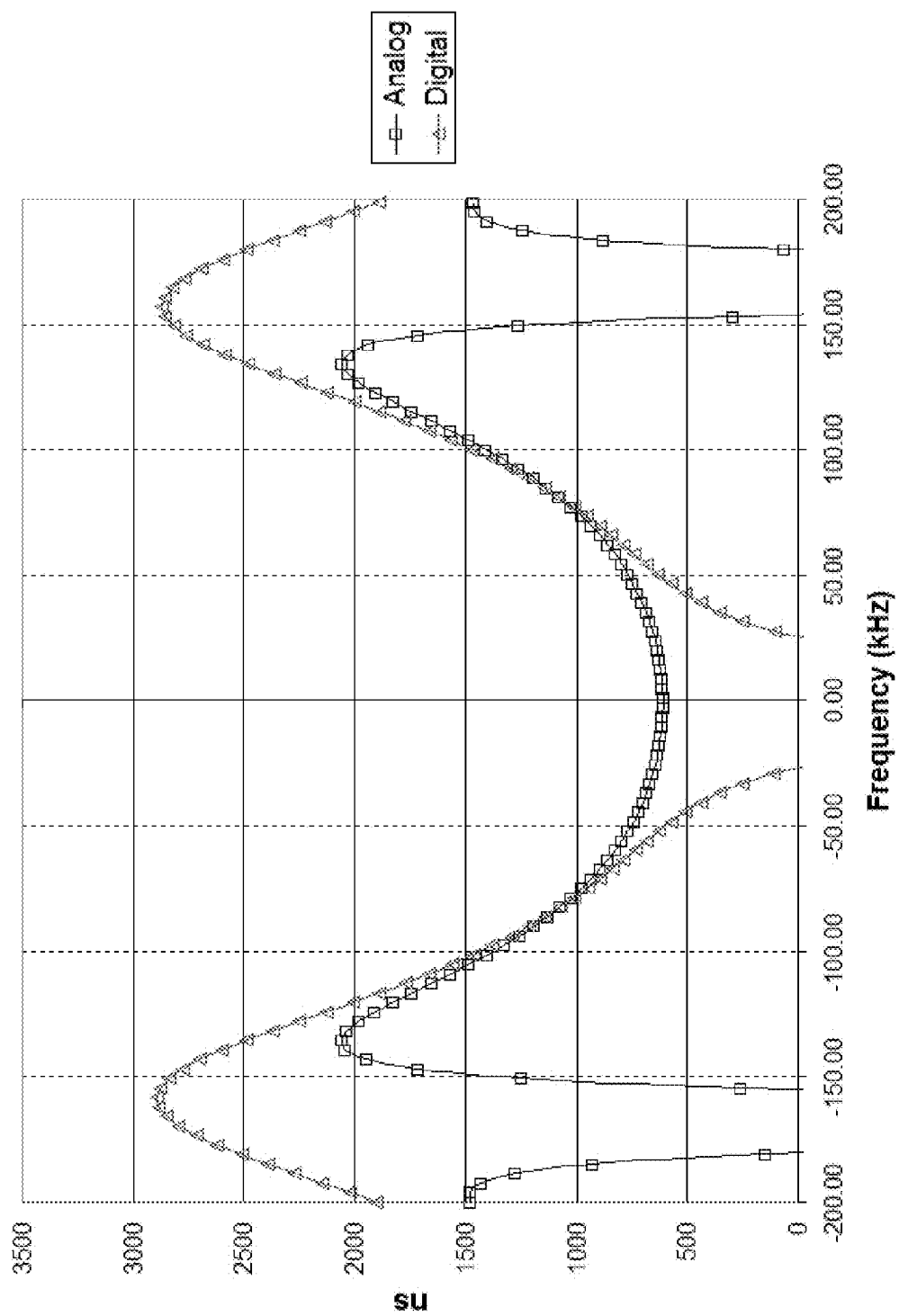
FIG. 11 shows the group delay plots with respect to their insertion response plots for the apparatus shown in FIGS. 5A & 5B and corresponding to the data shown in FIG. 7.

FIG. 10 shows the corresponding group delay plots with respect to their insertion response plots for the IBOC mask filter combiner, and FIG. 11 show the corresponding group delay plots with respect to their insertion response plots for the IBOC Allpass combiner 10. The IBOC Allpass combiner 10 approach of the present invention has been described and compared to the −10 dB injector and FM IBOC mask filter combiner approaches. It has higher efficiency than the −10 dB coupler and IBOC mask filter combiner, and improves group delay performance for both transmitter inputs while maintaining high efficiency. This approach, therefore, presents a new viable, alternative approach for combining high level analog and IBOC transmitters to be operated to a single antenna input.

Measured in terms of low group-delay distortion, low-loss, stability, and design simplicity, the IBOC Allpass combiner 10 outperforms all others. The IBOC Allpass combiner 10 has limit the amount of spurious energy a broadcast station may emit. The IBOC Allpass combiner, because of its phase shifting properties, directs approximately 10 dB, or 90%, of the spurious energy that is created to the residual load resistor in the circuit. The IBOC Allpass combiner can easily meet the stringent emissions requirements as mandated by the FCC.

Figure 1:
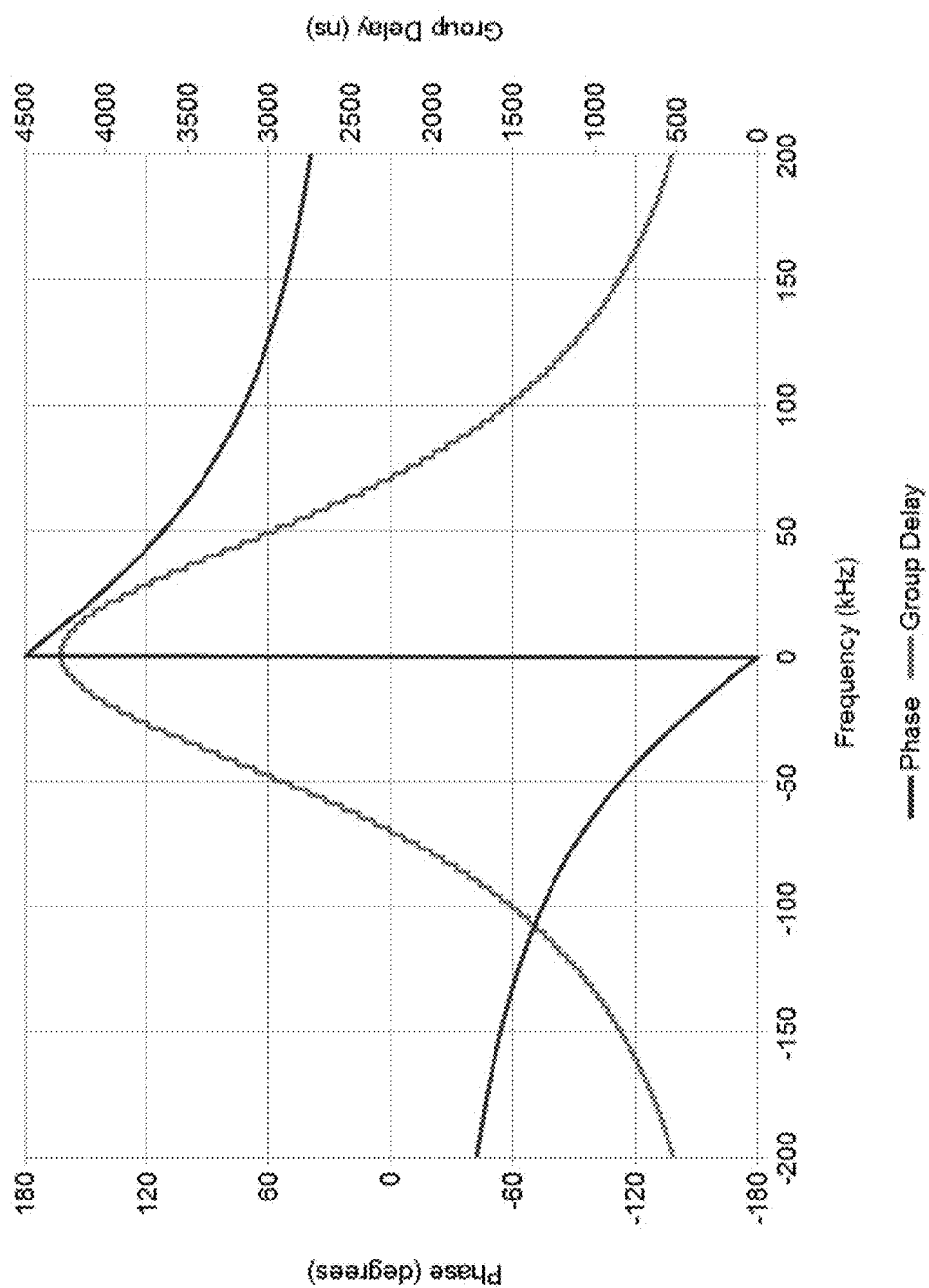
FIG. 1 shows a typical response for S11 resonant cavity group delay and S11 phase response according to the prior art.
Figure 2:
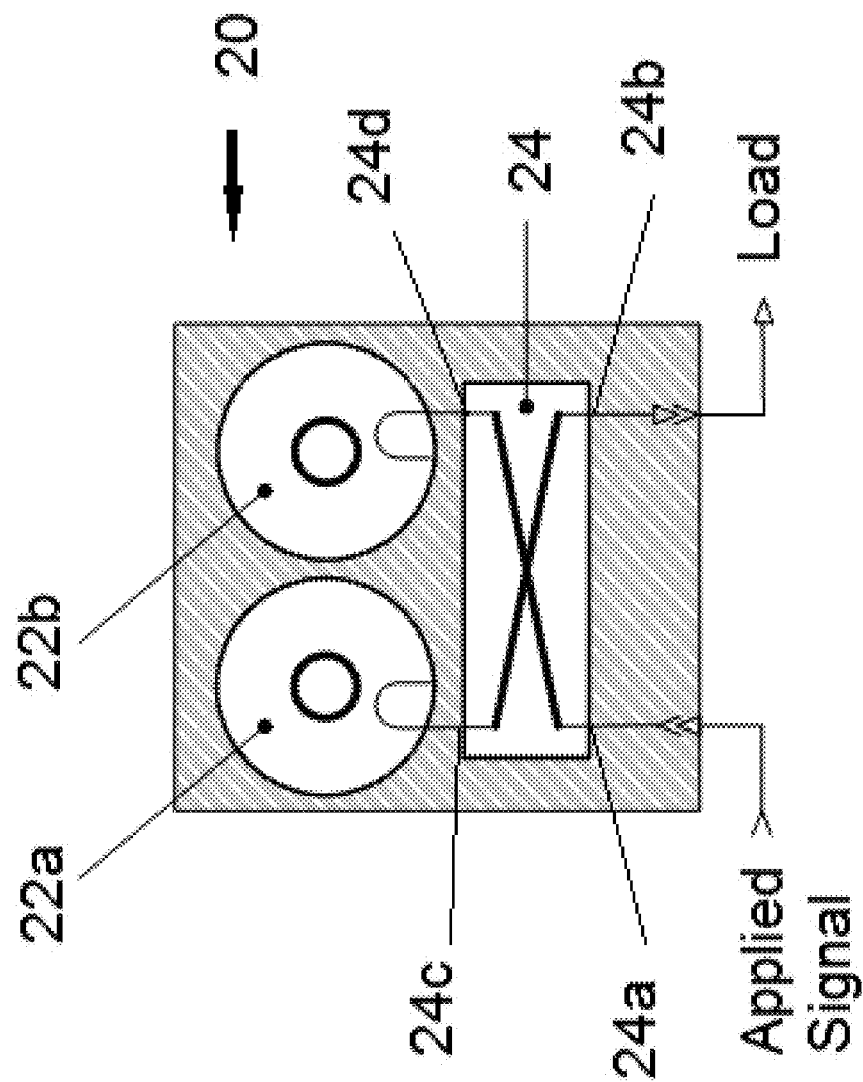
FIG. 2 shows an allpass filter used to phase discrete frequencies.
Figure 3:
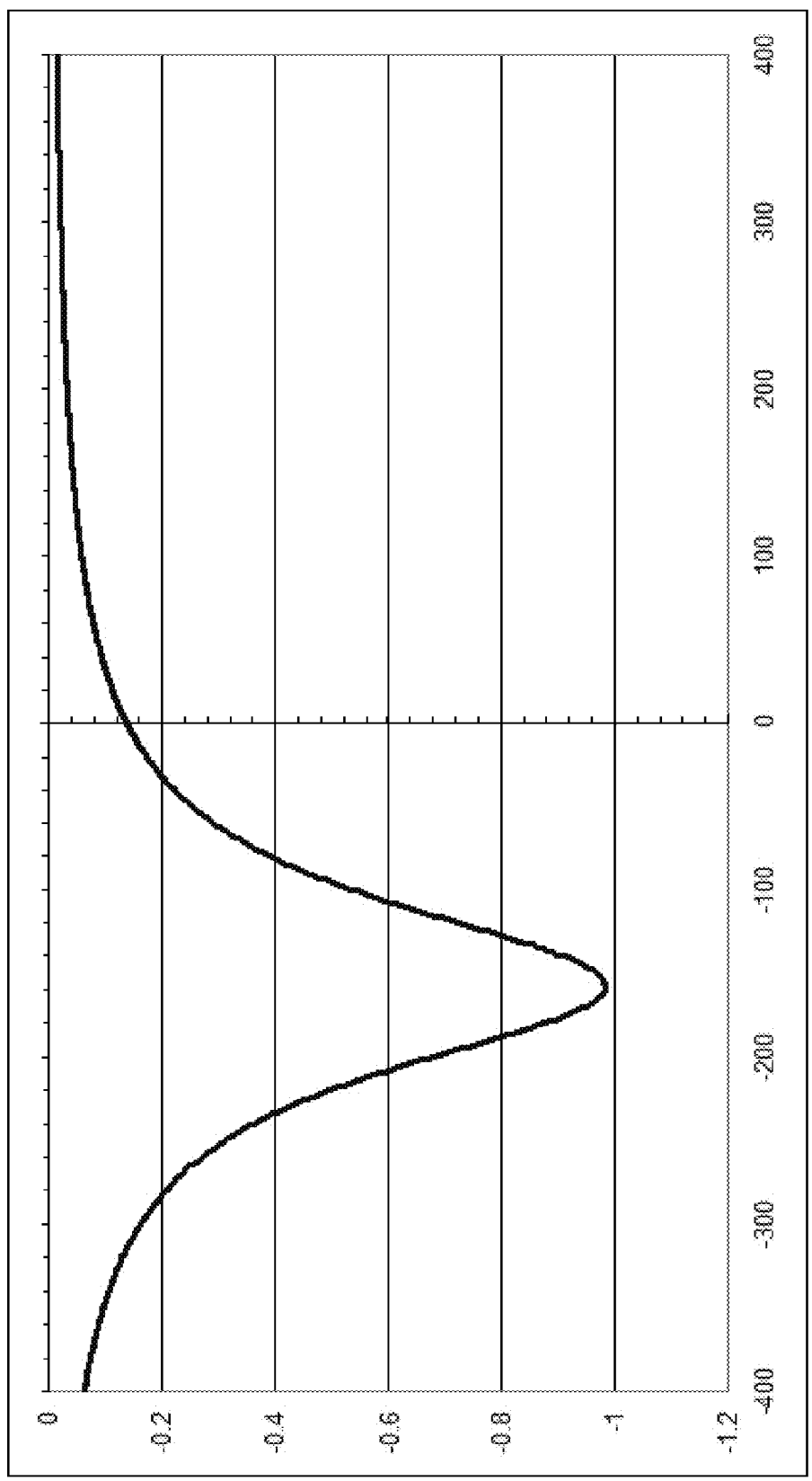
FIG. 3 shows the insertion loss curve of an allpass filter module tuned for the lower side band according to the present invention.
Figure 4:
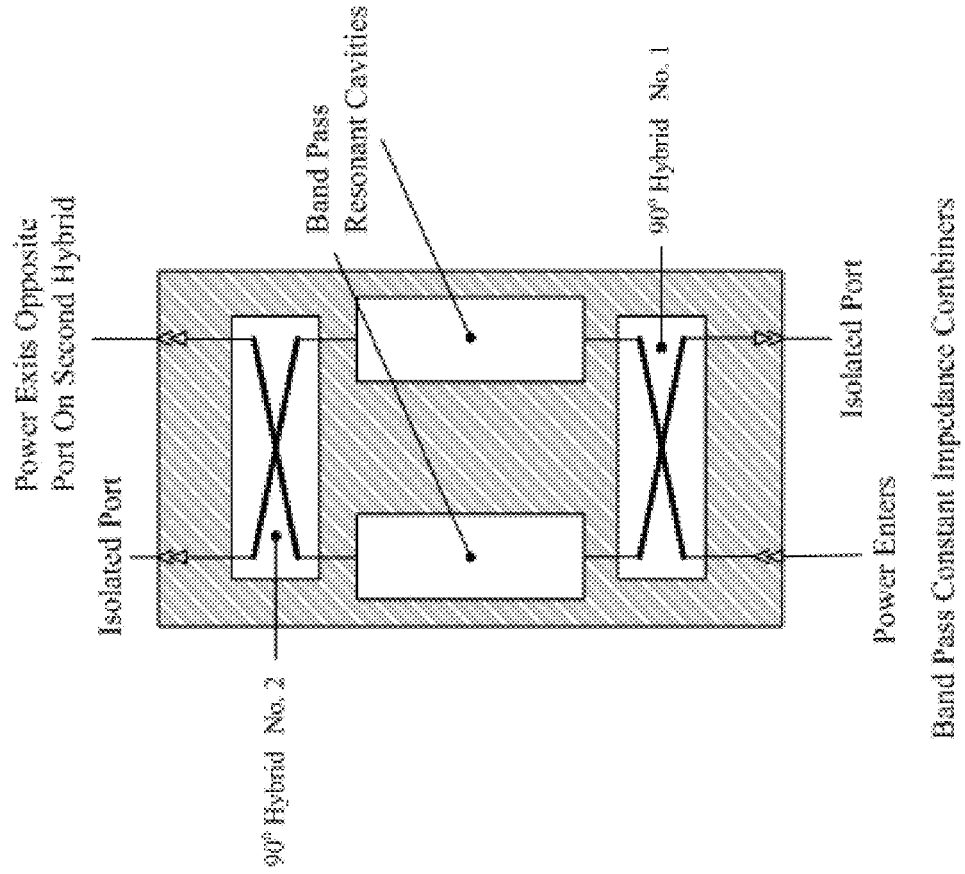
FIG. 4 shows a band pass constant impedance combiner according to the prior art.

The individual phase shifting allpass modules 20, 20' themselves also present a new method and apparatus for shifting phase of discrete isolated frequencies by 180 degrees while other frequencies, even close adjacent frequencies, are essentially unaffected. As shown in FIG. 2, a phase shifting allpass filter module 20 consists of an input hybrid 24 and two cavities 22a, 22b tuned to an isolated frequency to be phase shifted. The input signal or combination of signals is presented to the input port 24a of the hybrid 24, which splits all signals into two halves, ½ delivered with unaltered phase to cavity port 24c to the first tuned resonant cavity 22a and the second ½ delivered 90 degrees out of phase to cavity port 24d to the second resonant cavity 22b. Any and all signals presented to the resonant cavities 22a, 22b at resonant frequency are reflected back 180 degrees out of phase. All other frequencies are reflected without phase shift. All reflections from port 24c are delivered to load port 24b shifted an additional 90 degrees while reflections from port 24d are transmitted to the load port 24b without additional phase shift. As a result all respective signals are recombined at the load port 24b in phase, with the signal at resonant cavity frequency phase shifted 180 degrees from its input phase, and all other frequencies unaffected.

The foregoing is provided for purposes of illustrating, explaining, and describing embodiments of the present invention. The specific components and order of the steps listed above, while preferred is not necessarily required. Further modifications and adaptation to these embodiments will be apparent to those skilled in the art and may be made without departing from the scope or spirit of the invention.

The invention claimed is:

1. A device for combining analog and digital in-band-on-channel signals to feed a common antenna input comprising:
   a first directional coupler having a first/input port for receiving a digital input signal, a second/input port for receiving an analog input signal, a third/output port, and a fourth/output port, wherein said first directional coupler functions as a power divider;
   a first phase shifting allpass filter module having a first/input port electrically coupled to said third/output port of said first directional coupler, and a second/output port;
   a second phase shifting allpass filter module having a first/input port electrically coupled in series to said second/output port of said first phase shifting allpass filter module, and a second/output port; and
   a second directional coupler having a first/input port electrically coupled to said second/output port of said second phase shifting allpass filter module, and a second/input port electrically coupled to said fourth/output port of said first directional coupler, wherein said second directional coupler functions as a power combiner.

2. The device for combining analog and digital in-band-on-channel signals according to claim 1, wherein a third/output port of said second directional coupler is electrically coupled to the common antenna input; and further comprising a load resistor electrically coupled to a fourth/output port of said second directional coupler.

3. The device for combining analog and digital in-band-on-channel signals according to claim 1, wherein the first directional coupler splits the digital signal from the first/input port and transmits a first ½ of the digital signal to the third/output port of the first directional coupler in phase, and a second ½ of the digital signal to the fourth/output port of the first directional coupler phase shifted 90 degrees; and the first directional coupler splits the analog signal from the second/input port and transmits a first ½ of the analog signal to the third/output port of the first directional coupler phase shifted 90 degrees, and a second ½ of the analog signal to the fourth/output port of the first directional coupler in phase.

4. The device for combining analog and digital in-band-on-channel signals according to claim 3, wherein the digital input signal comprises an upper digital IBOC sideband and a lower digital IBOC sideband.

5. The device for combining analog and digital in-band-on-channel signals according to claim 4, wherein the first phase shifting allpass filter module produces a 180 degree phase shift in the lower digital IBOC sideband at an isolated frequency with a rapidly diminishing phase shift at adjacent frequencies.

6. The device for combining analog and digital in-band-on-channel signals according to claim 5, wherein the second phase shifting allpass filter module produces a 180 degree phase shift in the upper digital IBOC sideband at an isolated frequency with a rapidly diminishing phase shift at adjacent frequencies.

7. The device for combining analog and digital in-band-on-channel signals according to claim 6, wherein the second directional coupler:
   receives the 180 degree phase shifted first ½ of the upper and lower digital IBOC sidebands and 90 degree phase shifted first ½ of the analog signal at the first/input port of the second directional coupler;
   receives the 90 degree phase shifted second ½ of the upper and lower digital IBOC sidebands and in phase second ½ of the analog signal at the second/input port of the second directional coupler;
   shifts the phase of the signals received at the second/input port of the second directional coupler an additional 90 degrees and combines the phase shifted signals from the second/input port of the second directional coupler with the unshifted signals from the first/input port of the second directional coupler for output to the common antenna input through a third/output port of the second directional coupler, said signals having aligned signal phase vectors resulting in summation of the respective phase vectors; and
   shifts the phase of the signals received at the first/input port of the second directional coupler an additional 90 degrees and combines the phase shifted signals from the first/input port of the second directional coupler with the unshifted signals from the second/input port of the second directional coupler for output to a load resistor through a fourth/output port of the second directional coupler, said signals summing vectorially out of phase resulting in cancellation of the respective signals.

8. The device for combining analog and digital in-band-on-channel signals according to claim 1, wherein the first directional coupler is a 3 dB quadrature hybrid coupler.

9. The device for combining analog and digital in-band-on-channel signals according to claim 1, wherein the second directional coupler is a 3 dB quadrature hybrid coupler.

10. The device for combining analog and digital in-band-on-channel signals according to claim 1, wherein said first phase shifting allpass filter module comprises:
    a 3 dB quadrature hybrid coupler having a first/input port, which corresponds to the first/input port of the first phase shifting allpass filter module, electrically coupled to said third/output port of said first directional coupler, and a second/output port, which corresponds to the second/output port of the first phase shifting allpass filter module;
    a first coaxial cavity resonator electrically coupled to a third port of said 3 dB quadrature hybrid coupler; and
    a second coaxial cavity resonator electrically coupled to a fourth port of said 3 dB quadrature hybrid coupler.

11. The device for combining analog and digital in-band-on-channel signals according to claim 10, wherein said second phase shifting allpass filter module comprises:
    a 3 dB quadrature hybrid coupler having a first/input port, which corresponds to the first/input port of the second phase shifting allpass filter module, electrically coupled to said second/output port of the first phase shifting allpass filter module, and a second/output port, which corresponds to the second/output port of the second phase shifting allpass filter module;
    a first coaxial cavity resonator electrically coupled to a third port of said 3 dB quadrature hybrid coupler; and
    a second coaxial cavity resonator electrically coupled to a fourth port of said 3 dB quadrature hybrid coupler.

12. The device for combining analog and digital in-band-on-channel signals according to claim 11, wherein the first phase shifting allpass filter module produces a 180 degree phase shift to the lower IBOC sideband and the second phase shifting allpass filter module produces a 180 degree phase shift to the upper IBOC sideband.

13. The device for combining analog and digital in-band-on-channel signals according to claim 11, wherein each coaxial cavity resonator comprises the interior conducting surface of a cylindrical outer tube and a quarter-wave copper center conductor.

14. The device for combining analog and digital in-band-on-channel signals according to claim 1, further comprising coaxial transmission lines for connecting each of the ports to one another.

15. The device for combining analog and digital in-band-on-channel signals according to claim 2, wherein approximately 10 dB of out of band spurious emissions are transmitted to the load resistor where they are attenuated.

16. A method for combining analog and digital in-band-on-channel signals to feed a common antenna input comprising the steps of:
splitting a digital signal that is input to a first/input port of a power divider into two equal amplitude signals, with a first ½ of the digital signal exiting the power divider in phase at a third/output port and a second ½ of the digital signal exiting the power divider phase shifted 90 degrees at a fourth/output port;
splitting an analog signal that is input to a second/input port of the power divider into two equal amplitude signals, with a first ½ of the analog signal exiting the power divider phase shifted 90 degrees at the third/output port and a second ½ of the analog signal exiting the power divider in phase at the fourth/output port;
phase shifting the digital signal by passing the combined second ½ of the analog signal and second ½ of the digital signal through a phase shifting allpass filter module wherein the digital signal is phase shifted 180 degrees at an isolated frequency with a rapidly diminishing phase shift at adjacent frequencies;
combining the combined first ½ of the analog and digital signals from the third/output port of the power divider with the combined second ½ of the analog and digital signals from an output of the phase shifting allpass filter module and outputting vectorial summed out of phase signals to a load resistor and in phase signals to an antenna input.

17. The method for combining analog and digital in-band-on-channel signals to feed a common antenna input according to claim 16, wherein the digital signal comprises a lower digital IBOC signal and an upper digital IBOC signal and the step of phase shifting the digital signal further comprises the steps of:
passing the combined second ½ of the analog signal and second ½ of the digital signal through a first phase shifting allpass filter module wherein the lower digital IBOC signal is phase shifted 180 degrees at an isolated frequency with a rapidly diminishing phase shift at adjacent frequencies;
passing the combined second ½ of the analog signal and second ½ of the digital signal through a second phase shifting allpass filter module wherein the upper digital IBOC signal is phase shifted 180 degrees at an isolated frequency with a rapidly diminishing phase shift at adjacent frequencies.

18. The method for combining analog and digital in-band-on-channel signals to feed a common antenna input according to claim 17, wherein the step of combining the digital and analog signals further comprises the steps of:

receiving the 180 degree phase shifted first ½ of the upper and lower digital IBOC sidebands and 90 degree phase shifted first ½ of the analog signal at a first/input port of a power combiner;
receiving the 90 degree phase shifted second ½ of the upper and lower digital IBOC sidebands and in phase second ½ of the analog signal at a second/input port of the power combiner;
shifting the phase of the signals received at the second/input port of the power combiner an additional 90 degrees and summing vectorially the phase shifted signals from the second/input port of the power combiner with the unshifted signals from the first/input port of the power combiner for output to the antenna input through a third/output port of the power combiner, said signals having been phase aligned vectorially resulting in summation of the respective phase vectors; and
shifting the phase of the signals received at the first/input port of the power combiner an additional 90 degrees and summing vectorially the phase shifted signals from the first/input port of the power combiner with the unshifted signals from the second/input port of the power combiner for output to a load resistor through a fourth/output port of the power combiner, said out of phase signals summing vectorially resulting in cancellation of the respective signals.

19. A device for shifting phase of discrete isolated frequencies by 180 degrees while other frequencies, even close adjacent frequencies, are essentially unaffected, comprising:
an input hybrid coupler having a first/input port for receiving one or more input signals and a second/load port;
a first coaxial cavity resonator tuned to an isolated frequency to be phase shifted and electrically coupled to a third port of said input hybrid coupler; and
a second coaxial cavity resonator tuned to the isolated frequency to be phase shifted and electrically coupled to a fourth port of said input hybrid coupler.

20. A method for shifting phase of discrete isolated frequencies by 180 degrees while other frequencies, even close adjacent frequencies, are essentially unaffected, comprising the steps of:
presenting one or more input signals to an input port of an input hybrid coupler;
using the input hybrid coupler to split said one or more signals into two halves;
delivering a first half of the split one or more signals with unaltered phase to a first tuned resonant cavity tuned to an isolated frequency to be phase shifted by way of a third port of the input hybrid;
delivering a second half of the split one or more signals 90 degrees out of phase to a second resonant cavity tuned to the isolated frequency to be phase shifted by way of a fourth port of the input hybrid;
reflecting said first half of the split one or more signals from the first tuned resonant cavity to the third port of the input hybrid, with any of said one or more signals at the isolated frequency 180 degrees out of phase and any of said one or more signals at frequencies other that the isolated frequency without phase shift;
reflecting said second half of the split one or more signals from the second tuned resonant cavity to the fourth port of the input hybrid, with any of said one or more signals at the isolated frequency 180 degrees out of phase and any of said one or more signals at frequencies other that the isolated frequency without phase shift;
delivering said reflected signals to the load port of the input hybrid with the signals from the first tuned resonant cavity shifted an additional 90 degrees and the signals from the second tuned resonant cavity without additional phase shift; and recombining said first half of the split one or more signals with said second half of the split one or more signals in phase, with any of said one more signals at resonant cavity frequency phase shifted 180 degrees from its input phase, and all other frequencies without shift in phase.

\* \* \* \* \*